Dec. 19, 1967  E. R. JOHNSON  3,358,962
SELF-LOCKING POSITIONING DEVICE
Filed Sept. 8, 1964  6 Sheets-Sheet 1

INVENTOR.
EARL R. JOHNSON
BY Head & Johnson
ATTORNEYS

Dec. 19, 1967  E. R. JOHNSON  3,358,962
SELF-LOCKING POSITIONING DEVICE
Filed Sept. 8, 1964  6 Sheets-Sheet 2

INVENTOR.
EARL R. JOHNSON
BY *Head & Johnson*
ATTORNEYS

Dec. 19, 1967     E. R. JOHNSON     3,358,962
SELF-LOCKING POSITIONING DEVICE
Filed Sept. 8, 1964     6 Sheets-Sheet 3

INVENTOR.
EARL R. JOHNSON
BY Head & Johnson
ATTORNEYS

Dec. 19, 1967        E. R. JOHNSON        3,358,962
SELF-LOCKING POSITIONING DEVICE
Filed Sept. 8, 1964        6 Sheets-Sheet 4

*INVENTOR*
EARL R. JOHNSON

BY *Head & Johnson*

ATTORNEYS

Dec. 19, 1967  E. R. JOHNSON  3,358,962
SELF-LOCKING POSITIONING DEVICE
Filed Sept. 8, 1964  6 Sheets-Sheet 5

INVENTOR.
EARL R. JOHNSON
BY Head & Johnson
ATTORNEYS

Dec. 19, 1967     E. R. JOHNSON     3,358,962
SELF-LOCKING POSITIONING DEVICE
Filed Sept. 8, 1964     6 Sheets-Sheet 6
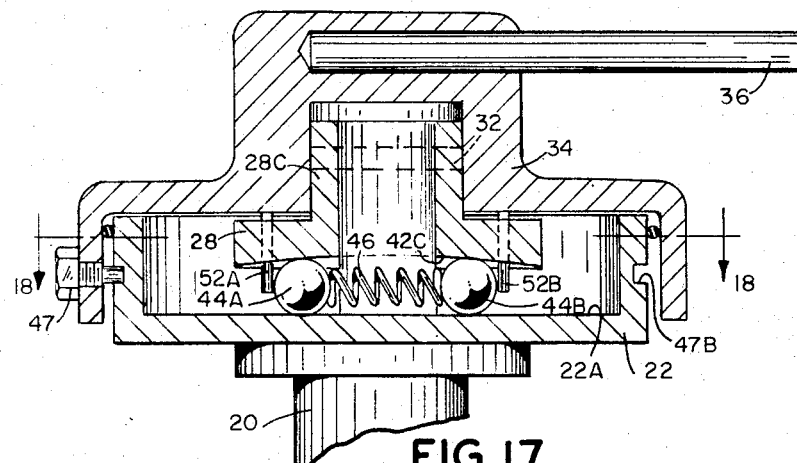
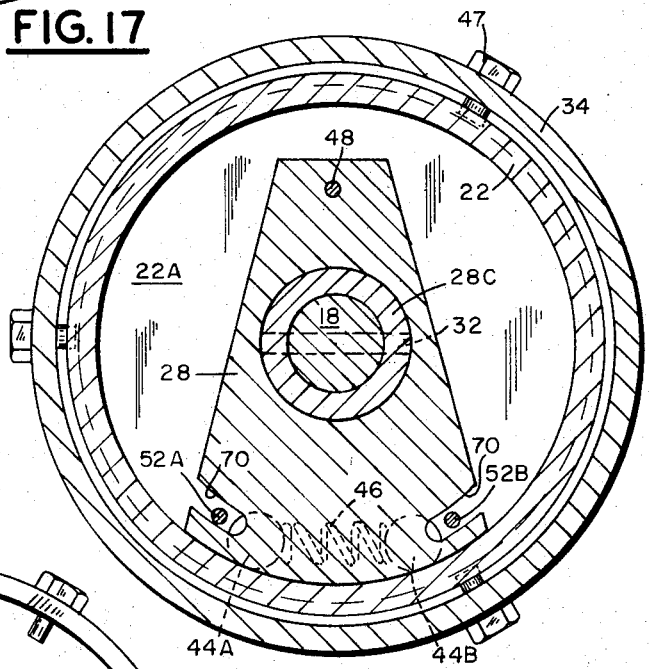
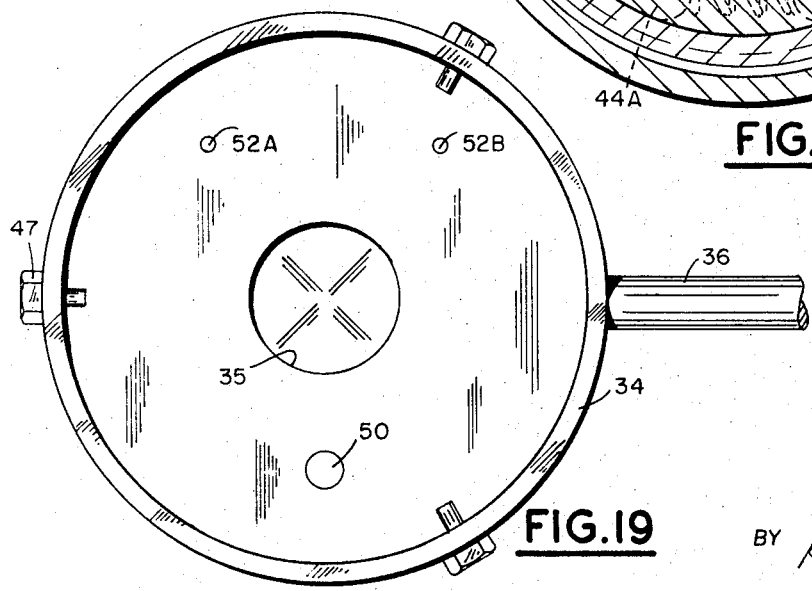
INVENTOR
EARL R. JOHNSON
BY *Head & Johnson*
ATTORNEYS

United States Patent Office 3,358,962
Patented Dec. 19, 1967

3,358,962
SELF-LOCKING POSITIONING DEVICE
Earl R. Johnson, Tulsa, Okla., assignor to The Dover Corporation, W. C. Norris Division, Tulsa, Okla., a corporation of Delaware
Filed Sept. 8, 1964, Ser. No. 394,883
8 Claims. (Cl. 251—77)

This invention relates to a self-locking positioning device. More particularly, this invention relates to a device including means whereby a shaft may be rotationally positioned, and whereby, when positioning force is released, the shaft is firmly retained in the set position. In one application, the invention relates to a self-locking positioning device to control the positioning of the closing member of a valve whereby the closing member may be readily rotated from one position to another and whereby the closing member is always locked in position except when it is being moved from one position to another.

This invention will be described as it is particularly adapted for use to position the closing member of a vave, such as a butterfly valve. It is understood that the exemplification of one application of the invention is for illustrative purposes only and that the invention is in no wise limited to such exemplified application but broadly relates to a self-locking mechanism adaptable to lock a rotatable shaft of any type device or machine in any desired rotational position.

It is an object of this invention to provide a self-locking positioning device.

A more specific object of this invention is to provide a self-locking positioning device adaptable to lock a shaft in any desired rotational position. This position is infinitely variable rather than limited to a few alternate positions as in conventional positioning mechanisms.

Another object of this invention is to provide a self-locking positioning device for a rotatable shaft, the device being so arranged that by rotational force on a cover member the shaft is rotated from one position to another, and further including means whereby as rotational force is relieved from the cover member the shaft is automatically locked in position.

When this invention is applied to control the closure member of a butterfly valve, or the like, an important object is to provide greatly increased safety to the personnel operating such valves. When larger size butterfly valves are utilized to control the flow of liquids or gases, it has been found that flow throgh the valve creates a considerable amount of torque on the closure member. With known types of locking devices utilized to lock the closure members in preset positions the closure member is free to rotate as soon as the locking force is released. Thus, if a handle is utilized to manually position a larger size butterfly valve, the sudden torque applied to the closure member by fluid flow through the valve can cause the handle to suddenly rotate, endangering the person attempting to reposition the valve. By the self-locking device of this invention the torque applied to the closure member cannot rotate the closure member in advance of the rotation of the handle.

In like manner, when a mechanical, electrical, hydarulic, pneumatic, or some similar means is used to position the closure member of a larger size butterfly valve, the application of the principles of this invention prevents the sudden application of force on the positioning equipment by the effect of torque applied to the closure member as a result of fluid flow through the valve. It is therefore an object of this invention to provide a self-locking positioning device for a rotatable shaft chracterized by means whereby the rotatable shaft cannot lead the rotation of the force applied to position the shaft.

Another object of this invention is the provision of a self-locking positioning device for a rotatable shaft including means whereby the shaft is rotatably manually positioned by means of a handle and further including means whereby the handle may be easily removed to prevent unauthorized personnel from repositioning the shaft and further to reduce the chance of vibration causing the shaft to be inadvertently repositioned.

Another object of this invention is to provide a self-locking device for positioning a rotatable shaft, the device characterized, in one embodiment, by two juxtaposed balls or rollers having locking engagement with one side of an interior cylindrical surface whereby thrust in locking is applied to the shaft in only one direction.

Another object of this invention is to provide a self-locking positioning device including a fixed base member having a cylindrical wedging surface and an axial opening having a rotatable shaft extending therethrough, the shaft having a locking member affixed thereto, and including two wedging members resiliently supported between the locking member and the cylindrical surface of the base member, and including means of disengaging selectively one or the other of the wedging members so that the shaft may be rotated and, most particularly, including means whereby the locking member is positively engaged subsequent to the disengagement of one of the wedging members for positive rotation of the shaft.

These and other objects will be fully described and a better understanding of the invention will be had by referring to the following description and claims taken in conjunction with the attached drawings in which:

FIGURE 17 is a cross-sectional view of an additional alternate embodiment of the self-locking positioning device of this invention.

FIGURE 18 is a cross-sectional view taken along the line 18—18 of FIGURE 17.

FIGURE 19 is a view of the lower side of the cover member of the embodiment of FIGURES 17 and 18.

This invention may be described as a self-locking positioning device. More particularly, but not by way of limitation, the invention may be described as a self-locking positioning device comprising a fixed base member having a cylindrical wedging surface and having a small diameter opening in the bottom thereof, a shaft extending through the opening in the bottom of the base member, the shaft extending coaxially of the cylindrical wedging surface of the base, a locking member affixed to the shaft having at least two directionally opposed wedging surfaces in proximity to the cylindrical wedging surface, a first and second wedge member positioned between the wedging surface of the locking member and the cylindrical wedging surface of the base member, a cover member rotatably supported about the shaft and adjacent the base member having spaced apart wedge engaging portions extending therefrom in close proximity to each of the wedge members, biasing means normally urging the wedging members into wedging engagement between the locking member and the cylindrical wedging surface of the fixed base member, the wedge members disengageable when contacted by the wedge engaging portions of the cover member whereby one or the other of the wedge members is disengaged as the cover member is rotated to permit the rotation of the locking member in the same direction of rotation as the cover member, and means with the cover member positively engaging the locking member to rotate the locking member with the cover member, the means engaging the locking member subsequent to the engagement of one of the wedge engaging portions with one of the wedge members as the cover member is rotated.

Figures 1, 2, 3, 4:
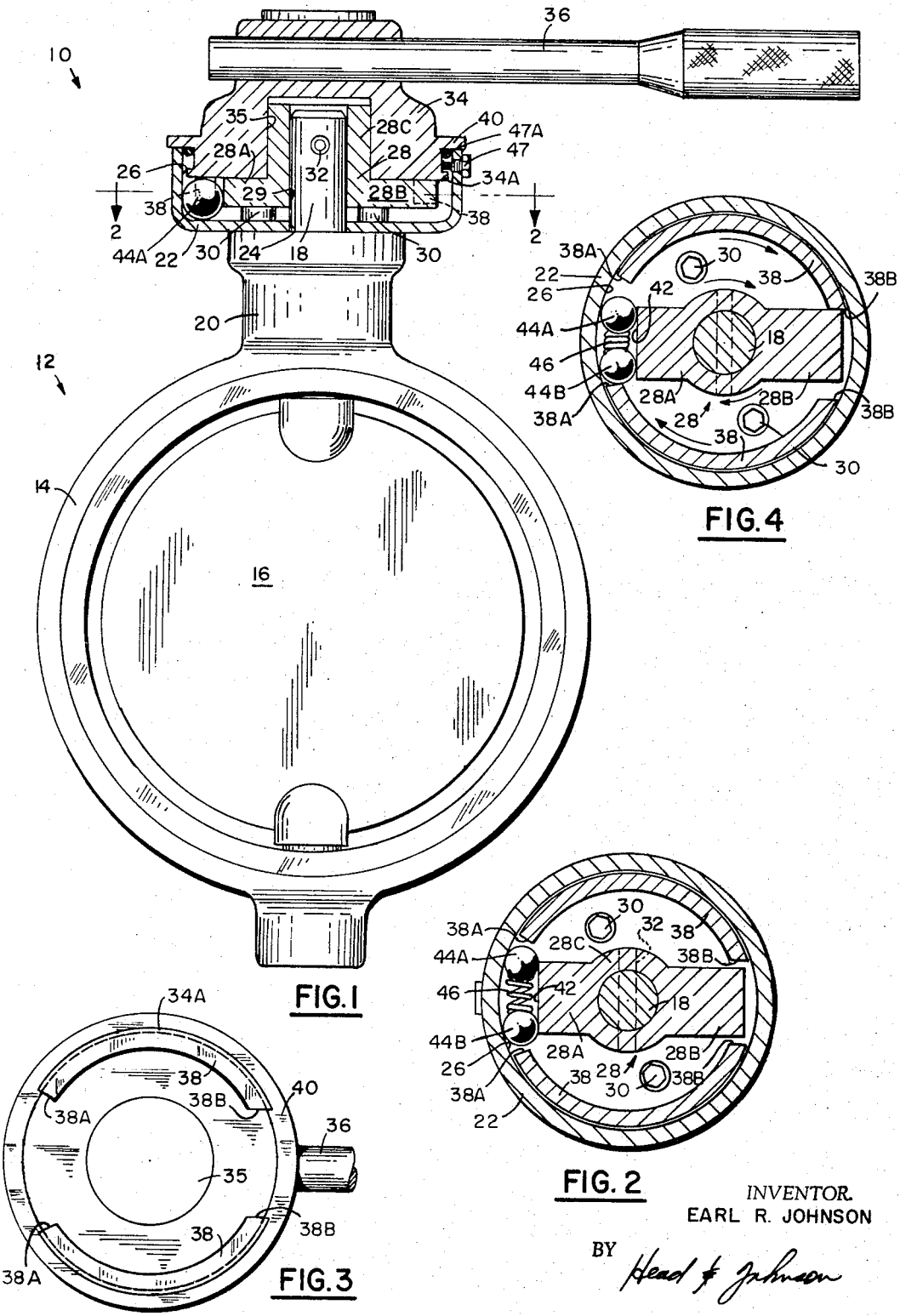
FIGURE 1 is an end view of a typical butterfly valve having the self-locking positioning device of this invention incorporated with the valve. The valve is shown in end view and the self-locking positioning device, affixed thereto, in cross section.
FIGURE 2 is a cross-sectional view of the self-locking positioning device taken along the line 2—2 of FIGURE 1. The lower valve portion of FIGURE 1 is not shown in FIGURE 2.
FIGURE 3 is a bottom view of the cover member of the self-locking positioning device.
FIGURE 4 is a cross-sectional view as shown in FIGURE 2 showing the cover member in the position assumed as the valve shaft is rotated by the effect of rotational force applied to the cover member.

Referring now to the drawings and first to FIGURE 1, the self-locking positioning device is indicated generally by the numeral 10. For purposes of illustrating one application of the device, the self-locking positioning device 10 is shown as utilized with a butterfly valve, the valve being generally indicated by the numeral 12. The valve 12 consists essentially of a tubular body portion 14 having rotatably supported therein a closure member being in the form of a flat disc 16. FIGURE 1 shows the disc in fully closed position, the valve being shown in end view. Extending from the disc 16 and providing both a means to support and to rotate the disc is a shaft 18. The shaft 18 extends through an integral boss portion 20 forming a part of the tubular body 14. In normal practice a handle is affixed directly to shaft 18. When it is desired to move the closing member 16 from open to closed position or vice versa, or to any intermediate position, the handle is utilized to rotate shaft 18. This invention provides a means whereby the shaft 18 is locked in any desired position and includes means whereby the disc 16 may be moved to any new position by movement of a handle.

Supported to the upper surface of the boss portion 20 is a fixed base member 22 which may be described as tubular with a closed lower end having a small diameter opening 24 therein. The fixed base member 22 provides an internal cylindrical wedging surface 26. Shaft 18 rotatably extends through the small diameter opening 24 coaxially of the cylindrical wedging surface 26.

Affixed to the shaft 18 is a locking member 28. As best shown in FIGURE 2, the locking member 28 is provided with flat wing portions 28A and 28B. The fixed base member 22 is supported to the valve shaft boss portion 20, such as by means of bolts 30. The locking member 28 is securely affixed to shaft 18, such as by means of a pin 32.

Bolts 30 may serve an additional function of limiting the maximum angular rotation of the locking member 28 and thereby the shaft 18. For instance, in the application shown, bolts 30 may be so positioned to permit the shaft 18 to move through a maximum of 90° which is the angle of rotation necessary to rotate the closing member 16 from full open to full closed position and vice versa.

Referring again to FIGURE 1, the locking member 28 is provided with an integral upstanding tubular portion 28C about which is rotatably supported a cover member 34. By means of a handle 36 torque can be applied manually to rotate the cover member 34. It is understood, however, that this is by way of example only as the cover member 34 may be rotated by any other means including torque supplied by an electric motor, pneumatic or hydraulic mechanism, and so forth. Formed on the lower side of the cover member 34, and extending down to parallel the wing portions 28A and 28B of the locking member, are integral downwardly extending actuating boss portions 38 (see FIGURES 2, 3, and 4). Each of the boss portions 38 terminates at one end with a wedge engaging surface 38A and at the other end with a lock engaging surface 38B. The cover member 34 is provided with a flange portion 40 to cover the upper open end of the fixed base member 22.

As best shown in FIGURE 2, the wing portion 28A of the locking member terminates in a flat wedging surface 42 spaced from the internal cylindrical wedging surface 26 of the fixed base member 22. Positioned between the wedging surface 42 and the cylindrical wedging surface 26 is a first and second wedging member 44A and 44B. In the preferred embodiment the wedging members 44A and 44B are, as shown, in the shape of spheres. Urging the wedging members 44A and 44B in wedging relationship between the surfaces 42 and 26 is a spring 46.

An integral lower lip portion 34A is provided on cover member 34. A screw 47 is threadably inserted in the upper end of the fixed base member 22 to prevent the accidental removal of the cover member. While only one screw 47 is shown, obviously a greater number, each equally spaced from the other, may be utilized. An O-ring gasket 47A is shown to seal against the entrance of dirt and moisture into the interior of the fixed base member 22. The illustrated method of retaining the cover member is merely exemplary as there are various other means which can equally as well be applied.

*Operation of embodiment shown in FIGURES 1 through 4*

As shown best in FIGURE 2, wedging members 44A and 44B are urged in wedging relationship between the wedging surface 42 of the locking member 28 and the internal cylindrical wedging surface 26 of the fixed base member 22. Thus the shaft 18, being affixed to locking member 28, is prevented from rotating in either direction. If force is applied, such as to closing member 16, to tend to rotate the shaft 18 in either direction, increased wedging takes place between one or the other of the wedging members 44A and 44B preventing rotation of the shaft. When cover member 34 is rotated, however, an entirely different effect occurs. First it can be seen that there is some movement or slack in the rotation of the cover member 34. During the first few degrees of rotation in either direction of the cover member 34, no action takes place as the cover member is freely rotatable around the tubular portion 28C of the locking member. Upon further rotation of cover member 34, however, one or the other of boss portions 38 engages, at the forward wedge engaging surface 38A, one of the wedging members 44A or 44B. This engagement dislodges either the wedging member 44A or 44B out of wedging engagement, permitting the locking member 28, and thereby shaft 18, to be rotated.

Subsequent to the dislogement of one or the other of the wedging members 44A and 44B, one or the other of the lock engaging surfaces 38B of one of the boss portions 38, engages the wing portion 28B of the locking member 28. This is best shown in FIGURE 4. In this manner, force is applied directly from the cover member 34 through one or the other of the boss portions 38 to locking member 28 to cause rotation of shaft 18. It is seen that the rotation of cover member 34 provides two functions: First, one or the other of the wedging members 44A or 44B is moved out of wedging engagement. Second, with a few degrees further rotation of cover member 34 the locking member 28 is contacted to positively rotate the shaft 18.

It can be seen that the configuration of the self-locking positioning device of FIGURES 1 through 4 provides a device which securely locks the shaft 18 from rotation in either direction by the effect of any force applied to the shaft itself, and at the same time provides means so that upon the rotation of the cover member 34, such as by manual torque applied to handle 36, the shaft is first unlocked and subsequently a positive contact is made between the cover member and the locking member to rotate the locking member. Upon the cessation of the rotation of the cover member both wedging members 44A and 44B return to locking position so that no further rotation in either direction of the shaft can occur. This means that as long as no torque is applied to cover member 34, shaft 18 will remain in a fixed position.

As shown in FIGURES 2 and 4, the wedging surface 42 of the locking member is a straight line. It can be seen that this is not critical to the invention. Wedging surface 42 may be of substantially any shape as long as the radius of curvature is greater than the radius of curvature of the internal cylindrical wedging surface 26 so that a wedging relationship is established by means of the wedging members 44A and 44B. Boss portions 38 of cover member 34 may be of virtually any configuration which provides the wedge engaging surfaces 38A and the locking member engaging surfaces 38B.

Figure 5:
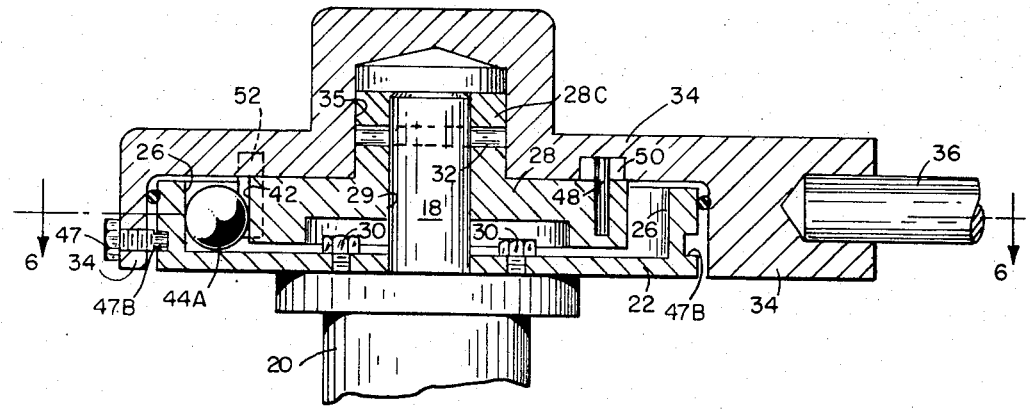
FIGURE 5 is a cross-sectional view of an alternate embodiment of the self-locking positioning device of this invention.
Figure 6:
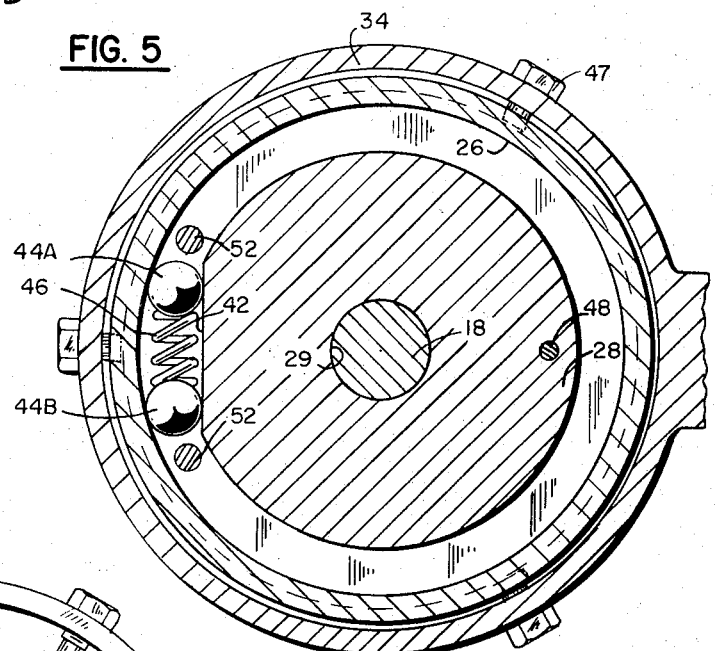
FIGURE 6 is a cross-sectional view taken along the line 6—6 of FIGURE 5.
Figure 7:
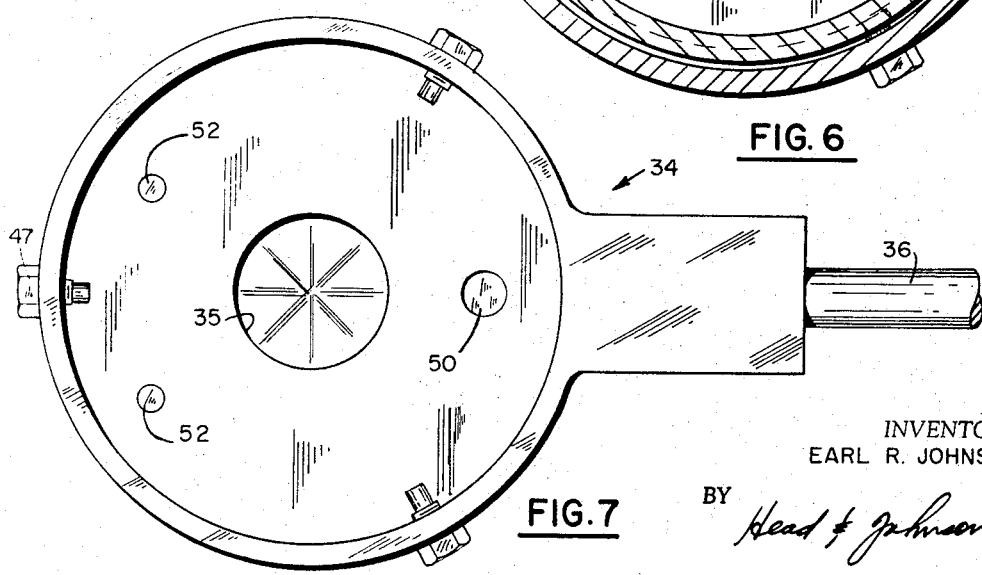
FIGURE 7 is a view of the lower surface of the cover member of the device of FIGURES 5 and 6.

*Alternate embodiment shown in FIGURES 5, 6 and 7*

In the alternate embodiment of FIGURES 5, 6 and 7 the locking member 28 is changed in shape from the first presented embodiment but functions substantially the same. The wedging surface 42 is formed on an otherwise cylindrical locking member 28. A drive pin 48 is affixed to the locking member and extends upwardly where it is loosely received in a hole 50 in the cover member 34. Wedge engaging pins 52 extend from the cover member 34 adjacent the wedging members 44A and 44B. Upon rotation of the cover member 34 one or the other of the wedge engaging pins 52 engages one of the wedging members 44A and 44B to dislodge it and permit rotation of the locking member 28. As the cover member 34 is rotated immediately subsequent to the dislodging of one or the other of wedging members 44A or 44B, the drive pin 48 is contacted by the periphery of the hole 50 to positively rotate the locking member and thereby shaft 18. The hole 50 may be of any suitable configuration. It can be seen that various other means may be provided as a substitute for the drive pin 48 and the wedge engaging pins 52. The essence of the invention is the provision of means for providing positive engagement between the cover member 34 and the locking member 28 for rotation of the locking member 28 subsequent to the dislodging of one or the other of the wedging members 44A and 44B.

It can be seen that in the embodiment of FIGURES 5, 6 and 7 the wedge engaging pins 52 are the equivalent of the wedge engaging surfaces 38a of the embodiment of FIGURES 1 through 4. In like manner, the hole 50 is the equivalent of the locking member engaging surfaces 38B of the former embodiment.

The wedging surface 42 of locking member 28 is shown and described as a flat surface. Such "flat" surface includes any surface having a radius of curvature greater than the radius of curvature of the cylindrical wedging surface 26.

Figure 8:
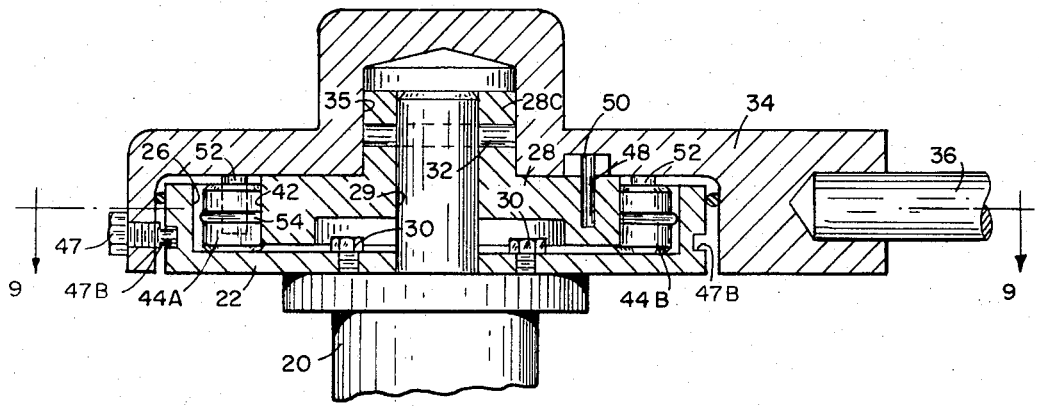
FIGURE 8 is a cross-sectional view of an additional alternate embodiment of the self-locking positioning device of this invention.
Figure 9:
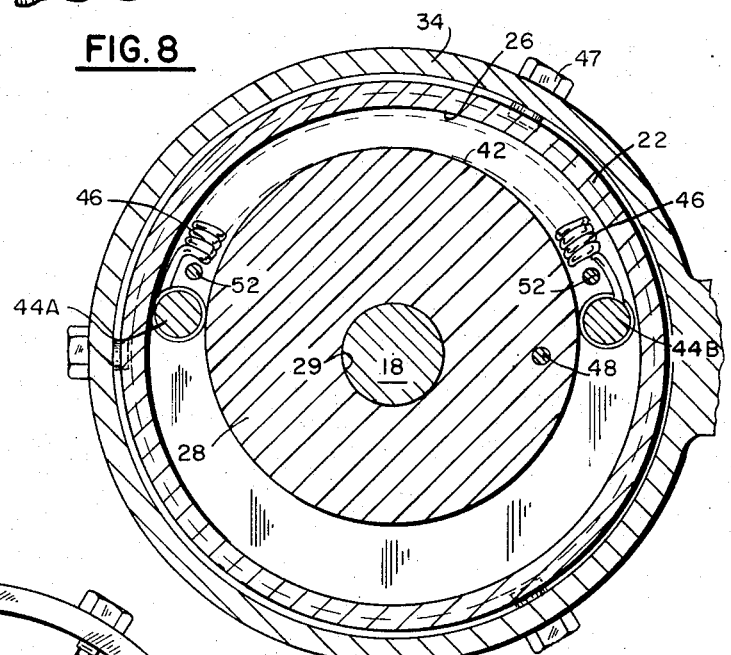
FIGURE 9 is a cross-sectional view taken along the line 9—9 of FIGURE 8.
Figure 10:
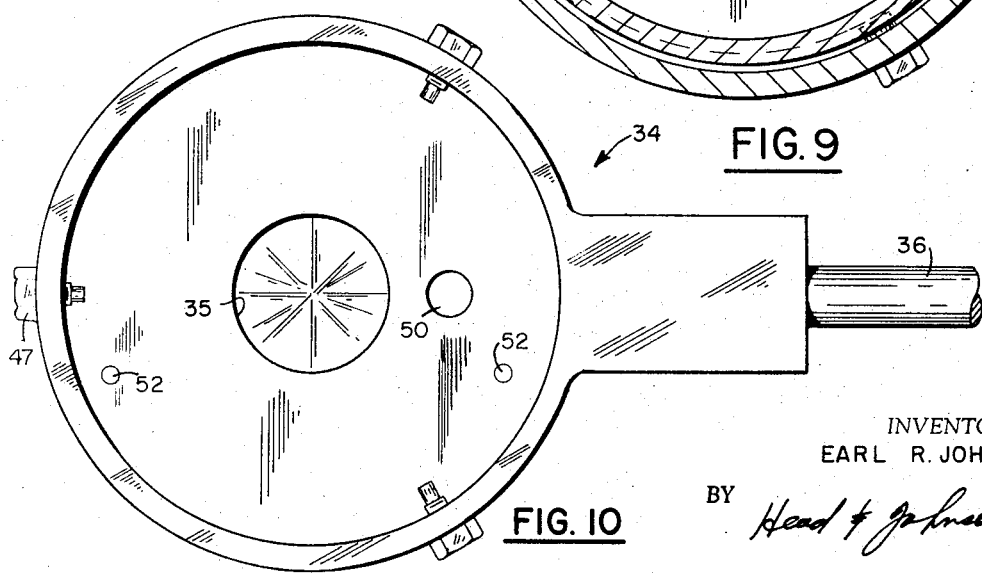
FIGURE 10 is a view of the lower side of the cover member of the self-locking positioning device of FIGURES 8 and 9.

*Alternate embodiment shown in FIGURES 8, 9, and 10*

In this embodiment, best shown in FIGURE 9, the locking member 28 is shaped as an eccentric cylinder. That is, the shaft 18 is received through an off-center opening 29. Wedging members 44A and 44B are wedged between the internal cylindrical wedging surface 26 of the fixed base member 22 and the exterior wedging surface 42 of the locking member 28. Wedging surface 42 is that part of the cylindrical surface of the eccentric locking member 28 lying closest to the internal cylindrical wedging surface 26 of the base member.

Wedging members 44A and 44B are preferably cylindrical and each is provided, as best shown in FIGURE 8, with a reduced diameter circumferential spring receiving slot 54. Each end of the spring 46 is hooked into a slot 54. Contrasted with the first two embodiments, the embodiment of FIGURES 8 through 10 utilizes a spring in tension, the spring serving to pull the wedging members 44A and 44B into locking relationship.

Affixed to and extending perpendicular from the interior surface of the cover member 34 are two wedge engaging pins 52 which extend adjacent the wedging members 44A and 44B and between the wedging members and spring 46. In the manner described for the embodiment of FIGURES 5 through 7, a drive pin 48 is affixed to the upper surface of the locking member 28 and is received in a hole 50 in the cover member.

The embodiment of FIGURES 8 through 10 functions substantially as described with reference to the embodiment of FIGURES 5 through 7. When the cover member 34 is rotated in the direction in which it is desired to move the shaft 18, a wedge engaging pin 52 first contacts one of the wedging members 44A or 44B to move it out of wedging relationship. After this movement of one of the wedging members out of wedging relationship drive pin 48 is next contacted by the periphery of hole 50 so that positive drive is applied from the cover member 34 to the locking member 28.

Figure 11:
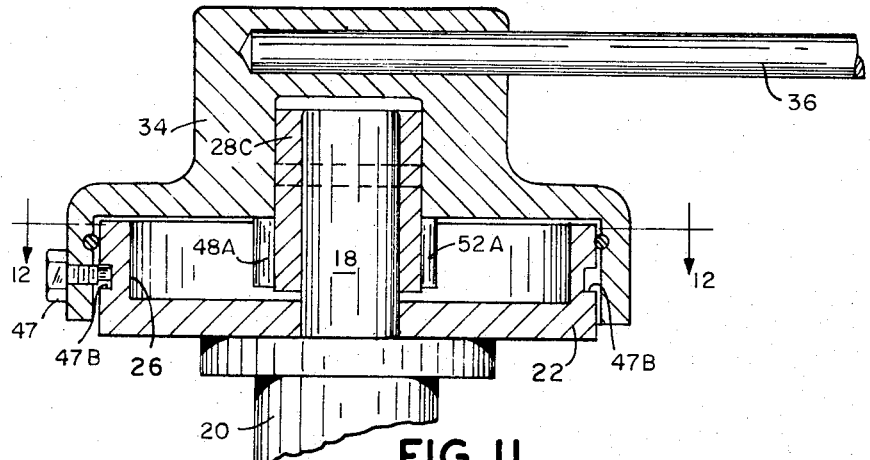
FIGURE 11 is a cross-sectional view of an additional alternate embodiment of the self-locking positioning device of this invention.
Figure 12:
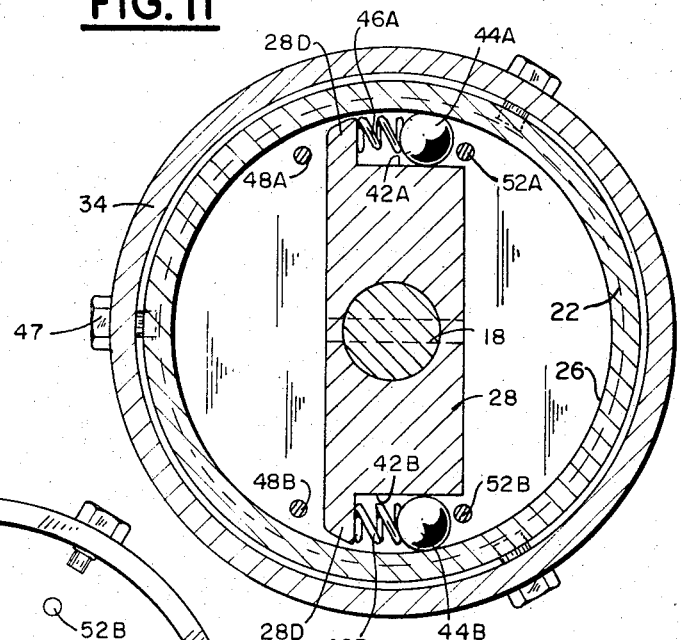
FIGURE 12 is a cross-sectional view taken along the line 12—12 of FIGURE 11.
Figure 13:
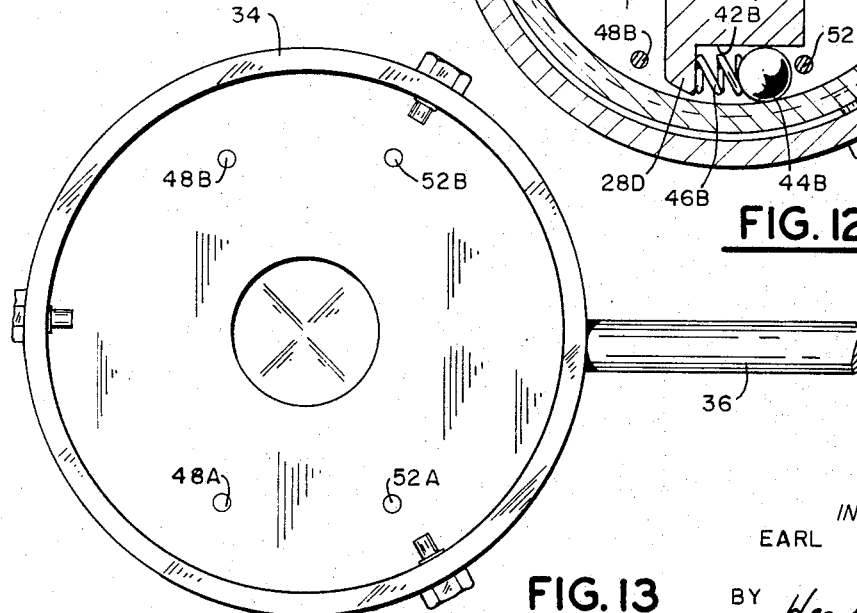
FIGURE 13 is a view of the lower side of the cover member of the self-locking positioning device of FIGURES 11 and 12.

*Alternate embodiment of FIGURES 11, 12 and 13*

In this embodiment, best shown in FIGURE 12, the locking member 28 is provided with a wedging surface at each opposed end, 42A and 42B. Both of the wedging members 44A and 44B are positioned at each end of the locking member to engage the cylindrical wedging surface 26 of the fixed base member 22 at substantially diametrical points. The locking member 28 is provided at each end with an extending spring retainer portion 28D. Springs 46A and 46B compressibly extend between the retainer portions 28D and the wedging members 44A and 44B.

In this embodiment two drive pins 48A and 48B are utilized with two wedge engaging pins 52A and 52B, each affixed to and extending from the inner upper surface of the cover member 34. When the cover member 34 is rotated, one of the wedge engaging pins 52A or 52B (depending upon the direction of rotation) engages one of the wedge members 44A or 44B to dislodge it and thereby permit the rotation of the locking member 28 and thereby the shaft 18. Immediately after one of the wedging members 44A or 44B has been dislodged one of the drive pins 48A or 44B (again depending upon the direction of rotation of cover member 34) engages locking member 28 to positively rotate it with the cover member.

Figure 14:
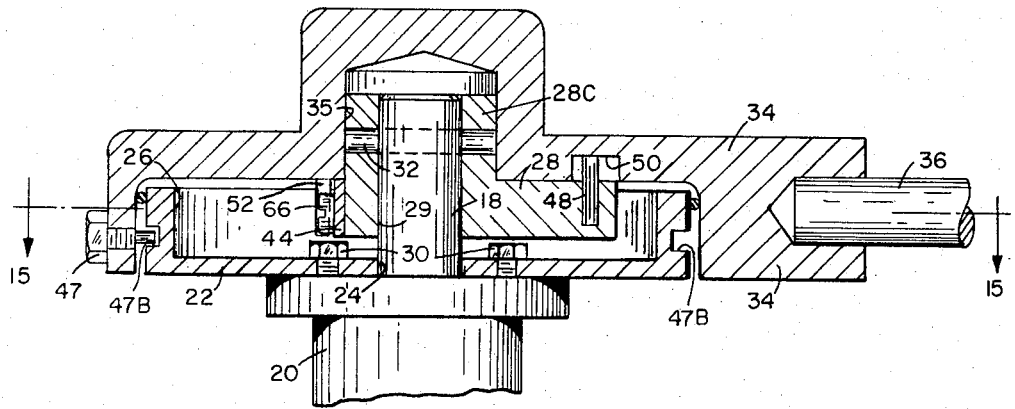
FIGURE 14 is a cross-sectional view of an additional alternate embodiment of the self-locking positioning device of this invention.
Figure 15:
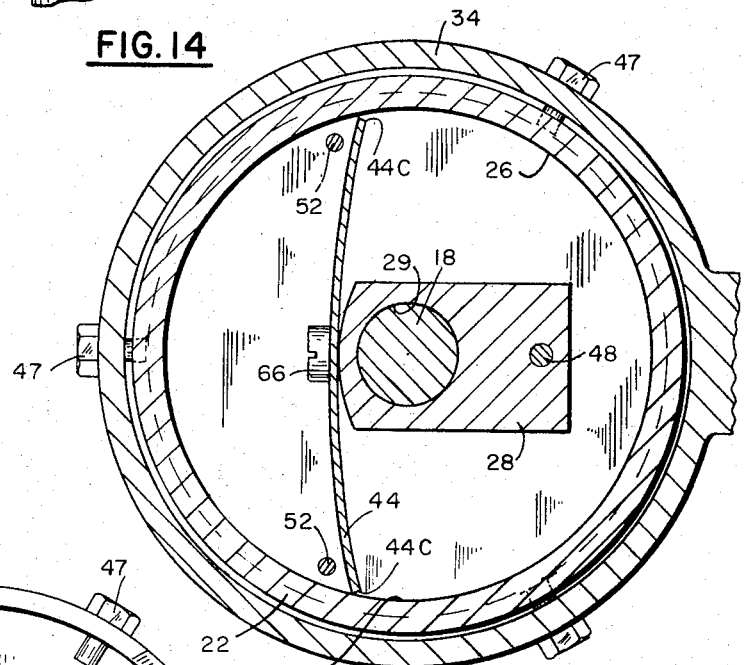
FIGURE 15 is a cross-sectional view taken along the line 15—15 of FIGURE 14.
Figure 16:
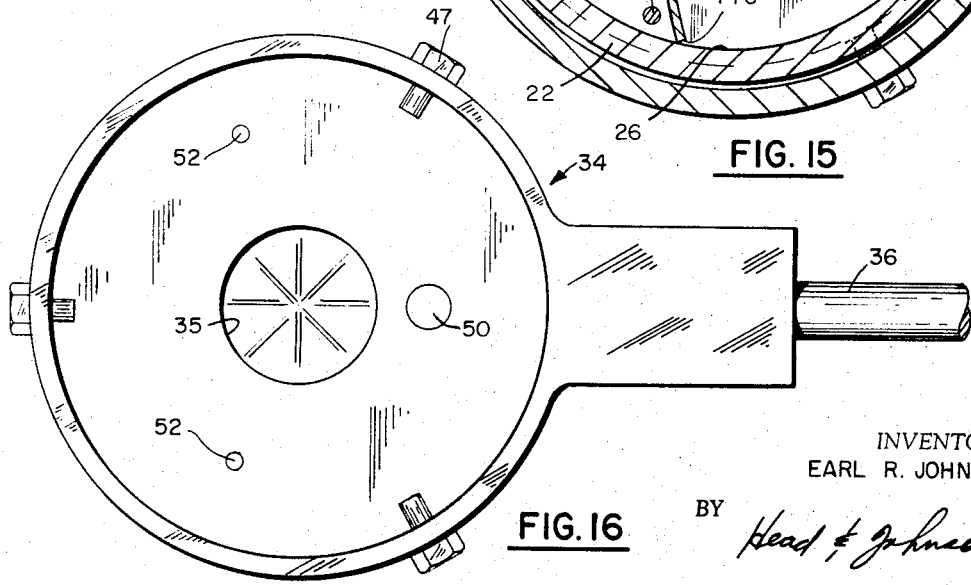
FIGURE 16 is a view of the lower side of the cover member of the embodiment of FIGURES 14 and 15.

*Alternate embodiment shown in FIGURES 14, 15 and 16*

This embodiment has a wedge member 44 affixed to the exterior vertical surface of the locking member 28. In this instance the wedge member 44 is in the form of a rectangular metallic member, preferably of spring steel. The outer edges 44C resiliently engage the internal cylindrical wedging surface 26 of fixed base member 22. The wedge member 44 is supported to the locking member 28 such as by means of a screw 66. The resilient contact of the vertical edges 44C of the wedge member 44 prohibits the rotation of the locking member 28 relative to the base member 22.

Wedge engaging pins 52 extend downwardly from the interior surface of the cover member 34 in close proximity to the edges 44C of the wedge member 44. When cover member 34 is rotating, such as manually by means of handle 36, one or the other of the pins 52 engages the wedge member 44 adjacent one end thereof, to move it out of wedging engagement with the surface 26. As the cover member 34 is further rotated, drive pin 48 is engaged by hole 50 to positively rotate the locking member 28, and thereby shaft 18. When torque is removed from cover member 34, the spring tension of wedge member 44 returns the displaced end to engagement with wedging surface 26. When no torque is applied to cover member 34, the locking member 28 and thereby shaft 18 is locked relative to the fixed base member 22.

*Alternate embodiment of FIGURES 17, 18 and 19*

This embodiment is distinguished from the others primarily in that the interior lower planar surface 22A of the fixed base member 22 serves as the wedging surface contrasted with the cylindrical wedging surface in each of the other embodiments. The locking member 28 is provided with a lower concave wedging surface 42C. Wedging members 44A and 44B are positioned between the concave wedging surface 42C of the locking member and the planar wedging surface 22A of the fixed base member 22 and are resiliently urged in such locking relationship by spring 46. The concave wedging surface 42C may be described as an arcuate lower wedging surface and by this expression is included inclined planar surfaces.

Slots 70 in locking member 28 (see FIGURE 18) receive the wedge engaging pins 52A and 52B which are affixed to and extend from the inner upper surface of cover member 34. When the cover member 34 is rotated one or the other of the wedge engaging pins 52A or 52B engages wedging member 44A or 44B (depending upon the direction of rotation of the cover member) to move it out of wedging relationship, thereby permitting the locking member 28 and shaft 18 to rotate. Upon further rotation of cover member 34 a drive pin 48 extending upwardly from the locking member 28 engages the boundary of a hole 50 in cover member 34 to positively couple the rotation of the cover member to the locking member.

As has been previously stated, the basic concept of this invention is the provision of a means whereby a shaft may be retained in a non-rotatable position. When it is desired to rotate the shaft, by manually applied torque or otherwise, a locking member is moved out of position and immediately subsequent thereto positive engagement is made to apply the rotating torque force directly to the locking member affixed to the shaft. The torque required to rotate the shaft is not in this invention transmitted through the locking or wedging means. That is, neither the resiliency of the wedge member 44, in the embodiment of FIGURES 14–16, nor the spring elements 46, in the embodiment of FIGURES 1–13 and 14–19 are required for the transmission of torque from the cover member to the shaft.

In each of the illustrative embodiments of the invention a handle 36 is received by a cover member 34. It can be seen that the handle members 36 can be easily removed and that such removal does not affect the shaft remaining automatically in locked position. With handle 36 removed the self-locking positioning device is less subject to being tampered with by unauthorized personnel. In addition, when the self-locking positioning device is utilized with any device subject to vibration, the removal of handle 36 eliminates any chance that the shaft rotational position will be altered by such vibration.

Although this invention has been described with a certain degree of particularity it is manifest that many changes may be made in the details of construction and the arrangement of components without departing from the spirit and scope of this disclosure. The description and drawings are exemplary of the application of the invention and are not to be taken in a limited sense but the scope of the invention is to be ascertained from the following claims.

What is claimed:
1. A self-locking positioning device comprising, in combination:
   a fixed base member having an internal cylindrical wedging surface open at the top and having a smaller diameter axial opening in the bottom;
   a coaxially extending shaft rotatably positioned in the smaller diameter opening of the fixed base member;
   a substantially flat leaf locking spring affixed to the shaft within the base member, the locking spring substantially forming a chord of the internal cylindrical wedging surface of the fixed base member, the ends of the locking spring resiliently engaging the internal cylindrical wedging surface of the base member to normally prevent the rotation of the shaft relative to the fixed base member;
   a cover member rotatably supported to the shaft adjacent the fixed base member, the cover member having spring engaging members extending within the base member adjacent the ends of the locking spring, each end of the spring disengageable from the internal wedging surface of the base member when contacted by a spring engaging member as the cover member is rotated to permit the rotation of the shaft in the same direction of rotation as the cover member; and
   means with the cover member positively engaging the shaft to rotate the shaft with the cover member, said means engaging the shaft subsequent to the engagement of one of the spring engagement members with one end of the spring as the cover member is rotated.

2. A self-locking positioning device according to claim 1 including:
   a handle member affixed to and extending from said cover member substantially perpendicular of said shaft for rotation of said cover member and thereby said shaft.

3. A self-locking positioning device according to claim 1 including:
   a locking member positioned above and parallel said fixed base member, said locking member having an opening therein receiving said shaft, and including means of securing said locking member to said shaft, and wherein said flat leaf locking spring is affixed to said locking member.

4. A self-locking positioning device according to claim 3 wherein the said means with the cover member positively engaging the shaft to rotate the shaft with the cover member includes means with the cover member engaging said locking member for rotation of said shaft.

5. A valve having self-locking positioning means, comprising, in combination:
   a valve body having a fluid passage opening therethrough, the body having an internal boss portion extending therefrom and an axial opening through the boss portion intersecting the fluid passage;
   a closure member rotatably supported in the valve body fluid passage for selectably opening and closing the fluid passage;
   a base member affixed to said boss portion and having an internal cylindrical wedging surface, said base member having an axial opening therein aligning with the axial opening in the boss portion,
   a shaft rotatably supported in the said axial openings in said base member and said body boss portion, said shaft affixed at one end to said closure member for rotatably positioning the closure member; a substantially flat leaf locking spring affixed to the shaft within the base member, the locking spring substantially forming a chord of the internal cylindrical wedging surface of the fixed base member, the ends of the locking spring resiliently engaging the internal cylindrical wedging surface of the base member to normally prevent the rotation of the shaft relative to the fixed base member;

a cover member rotatably supported to the shaft adjacent the fixed base member, the cover member having spring engaging members extending within the base member adjacent the ends of the locking spring, each end of the spring disengageable from the internal wedging surface of the base member when contacted by a spring engaging member as the cover member is rotated to permit the rotation of the shaft in the same direction of rotation as the cover member; and means with the cover member positively engaging the shaft to rotate the shaft with the cover member, said means engaging the shaft subsequent to the engagement of one of the spring engagement members with one end of the spring as the cover member is rotated.

6. A valve having self-locking positioning means according to claim 5 including a handle member affixed to and extending from said cover member substantially perpendicular of said shaft for rotation of said cover member and thereby said shaft.

7. A valve having self-locking positioning means according to claim 5 including:

a locking member positioned above and parallel said fixed base member, said locking member having an opening therein receiving said shaft, and including means of securing said locking member to said shaft, and wherein said flat leaf locking spring is affixed to said locking member.

8. A valve having self-locking positioning means according to claim 7 wherein the said means with the cover member positively engaging the shaft to rotate the shaft with the cover member includes means with the cover member engaging said locking member for rotation of said shaft.

References Cited

UNITED STATES PATENTS

| | | | |
|---|---|---|---|
| 1,889,295 | 11/1932 | Rosatelli | 192—8 X |
| 2,456,998 | 12/1948 | Schabel | 192—8 |
| 2,559,960 | 7/1951 | Houplain | 192—8 |
| 2,573,939 | 11/1951 | Ver Ville et al. | 192—8 |
| 2,844,236 | 7/1958 | Cole | 192—8 |
| 3,171,521 | 3/1965 | Kelly et al. | 192—8 |
| 3,198,477 | 8/1965 | Allenbaugh | 251—77 |
| 3,218,886 | 11/1965 | Bacchi et al. | 192—8 X |
| 3,243,023 | 3/1966 | Boyden | 192—8 |

FOREIGN PATENTS 377,378   7/1907   France.

M. CARY NELSON, *Primary Examiner.*

R. C. MILLER, *Assistant Examiner.*